(No Model.) 2 Sheets—Sheet 1.

G. M. VENABLE.
HEATING AND COOKING APPARATUS.

No. 257,789. Patented May 9, 1882.

Attest:
Geo. T. Smallwood Jr.
L. M. Hopkins

Inventor:
Gilbert M. Venable.
By Knight Bros.
Attys

N. PETERS. Photo-Lithographer, Washington, D. C.

(No Model.) 2 Sheets—Sheet 2.
G. M. VENABLE.
HEATING AND COOKING APPARATUS.
No. 257,789. Patented May 9, 1882.
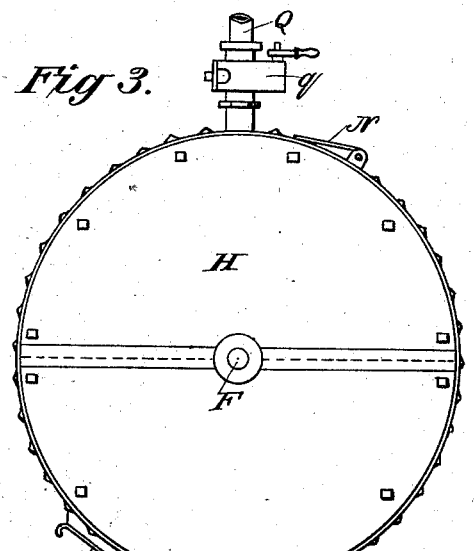
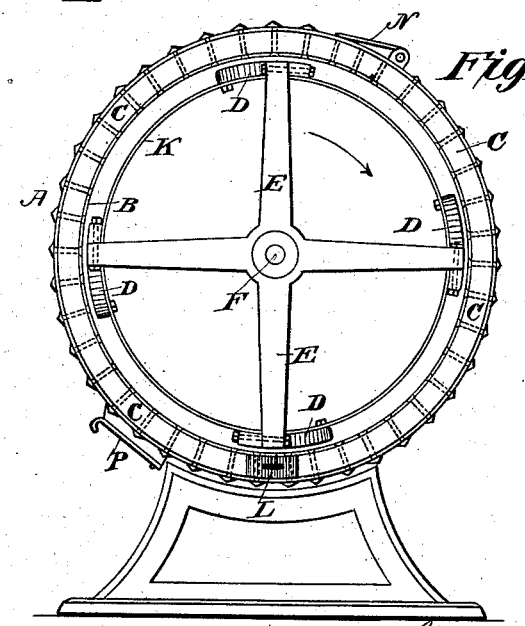
Attest:
Geo. T. Smallwood Jr.
L. M. Hopkins.
Inventor
Gilbert M. Venable,
By Knight Bros.
Attys

UNITED STATES PATENT OFFICE.

GILBERT M. VENABLE, OF MEMPHIS, TENNESSEE.

HEATING AND COOKING APPARATUS.

SPECIFICATION forming part of Letters Patent No. 257,789, dated May 9, 1882.

Application filed May 26, 1881. (No model.)

*To all whom it may concern:*

Be it known that I, GILBERT M. VENABLE, a citizen of the United States, residing at Memphis, in the county of Shelby and State of Tennessee, have invented Improvements in Heating and Cooking Apparatus, of which the following is a specification.

My invention relates to a heating and cooking apparatus consisting of a cylinder preferably divided into two parts by a central partition and completely surrounded by a steam-jacket. Within this cylinder works a horizontal shaft carrying a series of scrapers, of which four (more or less) may be placed at equal distances in each of the two divisions of the heater, said scrapers being V-shaped and curved, so as to be carried around in contact with the interior surface of the heater in order to stir the contents, and when the cooking or other treatment is completed to discharge the material through doors which are opened for the purpose, as hereinafter described.

The invention further relates to details of construction hereinafter more particularly described.

Figure 1:
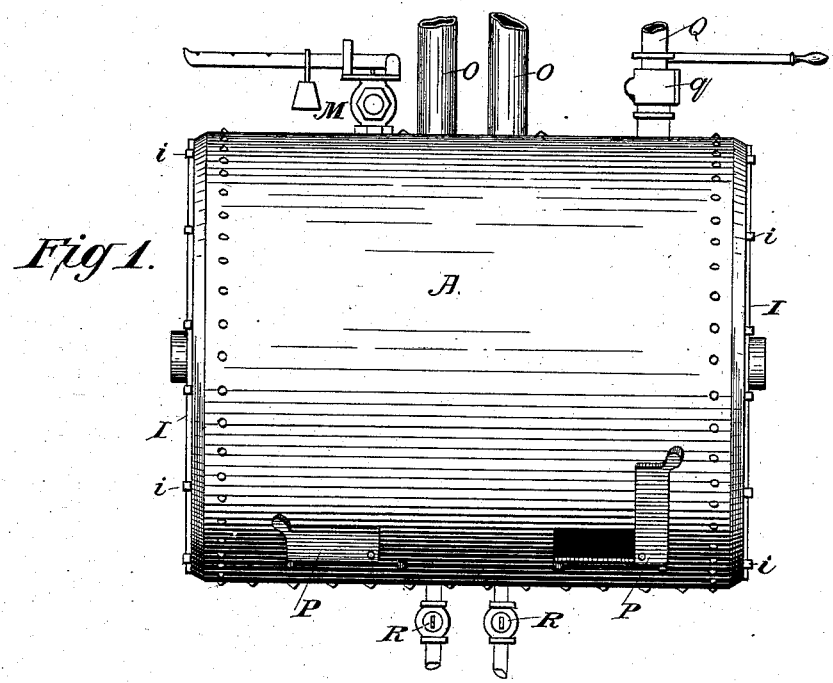
Figure 2:
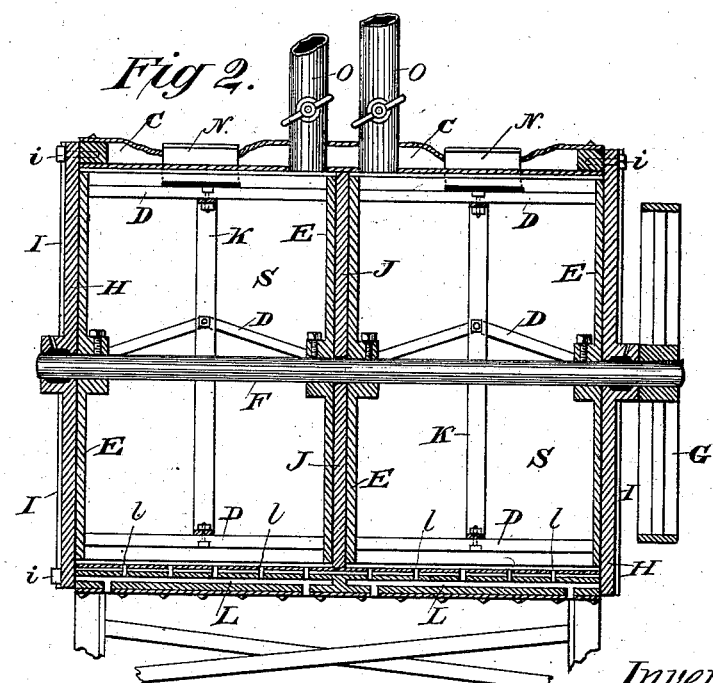

In the accompanying drawings, Figure 1 is an external view of the apparatus. Fig. 2 is a longitudinal section thereof. Fig. 3 is an end view of the same. Fig. 4 is a transverse section. Fig. 5 is a perspective view of one of the V-shaped knives or scrapers, hereinafter described.

The cylinder or casing is made up of two concentric shells, A B, between which is a steam-space, C.

D D represent a series of V-shaped scrapers or stirrers carried by arms E, projecting from a shaft, F, which passes axially through the cylinder, and is driven by an external pulley, G.

The heads H H of the cylinder may, if preferred, be made hollow, so as to form additional steam-chambers in connection with a steam-space, C. Said heads are secured in position by means of rings I and bolts *i*.

J is a central vertical diaphragm dividing the interior of the cylinder into two cooking-chambers, S S.

K K represent hoops extending around the interior of the casing (at the center of each of the chambers S S) and employed to support and brace the points of the scrapers D.

L are steamways under the bottom of the heater.

M represents a safety-valve.

N N are feed-doors, one for each chamber.

O O are escape-pipes from the interior of the chamber.

P P are discharge-doors.

Q is the steam-supply pipe provided with a throttle-valve, *q*.

The steamways L beneath the bottom of the heater communicate with the interior of the chambers S S through ports *l l*, extending along the same from end to end. If at any time it be required to empty or fill a chamber or several chambers while the remaining chambers are in full operation, the steam entering the chamber to be emptied through the valve R, connecting therewith, is shut off, the exhaust-valve in the pipe O leading therefrom opened, and when the steam has escaped the discharge-door P is unfastened. The knives D, still revolving, carry, by means of their peculiar shape, all material within the chamber to be discharged toward the center, and when arrived opposite the discharge-door discharge the material through the same. The discharge-door is then closed and the chamber again filled through the supply-door N. These steamways are provided with globe-valves R, one for each division of the heater, by regulating which any desired amount of steam may be introduced to the interior of the chambers for the purpose of moistening the contents, as may be required.

The apparatus is well adapted for cooking meal and various other materials, and by the use of steam under pressure it constitutes an effective roaster for coffee, peanuts, or other articles, and may be used for any roasting or cooking purposes, the casing being made of sufficient strength to resist the pressure necessary to develop the required heat.

Having thus described my invention, the following is what I claim as new therein and desire to secure by Letters Patent:

1. The heating or cooking apparatus herein described, consisting of a horizontal cylinder transversely divided into two or more separate chambers with independent discharge-doors, and a rotary shaft carrying scrapers adapted for stirring the contents of the respective chambers, and discharging them either simultaneously or separately, so that one chamber may be in full operation while another is being filled or emptied.

2. In combination with a cylindrical heater and a spider revolving axially therein, the V-shaped knives arranged to stir the materials under treatment, as described.

3. In combination with a cylindrical heater and an axially-revolving spider carrying suitable scraping-knives, the strengthening band or ring connecting said knives, for the purposes set forth.

GILBERT M. VENABLE.

Witnesses:
R. B. MILLER,
DAN SCHLOSS.